(12) United States Patent
Lin et al.

(10) Patent No.: US 8,391,593 B2
(45) Date of Patent: Mar. 5, 2013

(54) IMAGE PROCESSING METHODS AND SYSTEMS

(75) Inventors: Xiaofan Lin, Sunnyvale, CA (US); Hui Chao, San Jose, CA (US); Jian Fan, Cupertino, CA (US); Shridhar Diwan, Kondapur Village (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 2231 days.

(21) Appl. No.: 10/863,963

(22) Filed: Jun. 9, 2004

(65) Prior Publication Data
US 2005/0276477 A1 Dec. 15, 2005

(51) Int. Cl.
*G06K 9/34* (2006.01)
(52) U.S. Cl. .......................................... 382/164; 382/173
(58) Field of Classification Search .................. None
See application file for complete search history.

(56) References Cited

U.S. PATENT DOCUMENTS

| | | | | |
|---|---|---|---|---|
| 5,268,967 A | * | 12/1993 | Jang et al. | 382/132 |
| 6,205,236 B1 | * | 3/2001 | Rogers et al. | 382/132 |
| 2002/0081006 A1 | * | 6/2002 | Rogers et al. | 382/128 |
| 2002/0191861 A1 | * | 12/2002 | Cheatle | 382/282 |
| 2005/0025387 A1 | * | 2/2005 | Luo | 382/298 |

* cited by examiner

*Primary Examiner* — Chan S Park
*Assistant Examiner* — Sean Motsinger

(57) ABSTRACT

Systems and methods according to the present invention provide techniques to automatically crop an image to a desired size. Automating the cropping process, while at the same time providing a high quality, cropped image, can be accomplished by employing a comprehensive approach that includes one or more of contextual cropping (e.g., basing cropping decisions on elements within the image to be cropped itself), training the cropping mechanism (e.g., using previously cropped versions of the same image or related images) and multiple operational modes (e.g., selecting one of a plurality of different cropping techniques for cropping a particular image).

41 Claims, 6 Drawing Sheets

IMAGE PROCESSING METHODS AND SYSTEMS

BACKGROUND

The present invention relates generally to image processing systems and, more particularly, to methods and systems for automatically cropping an image.

Cropping an image refers to cutting away and discarding portions of the image. Cropping techniques evolved due to, among other things, challenges associated with precisely capturing a desired image using an image capture device, e.g., a camera. Photographic composition requires time and attention, which may not be available to a photographer in the act of capturing images of e.g., action events. Thus, after the fact, it may be desirable to change the focal point of the image by cropping the image. Today many images can be captured electronically and subsequently processed using image processing software. For example, many photo editing applications include a crop tool. Using the crop tool typically involves selecting the area to retain, refining the selection, and finalizing the crop action. Once the cropping procedure is finalized, the area outside the crop selection can be discarded.

Another area in which cropping can be used is in thumbnail generation. Thumbnails are small versions of original images which can be used, for example, in image retrieval or browsing systems. However, sometimes when an image is shrunk to create a corresponding thumbnail, it is no longer easily recognizable as representative of the original image. Accordingly, cropping can be used to reduce the size of an original image, prior to shrinking, in a way which captures important features of the original image and discards less important pixels.

Although cropping is typically performed manually, the growing reuse of objects and images in automated processes suggests that automated cropping is desirable. More specifically, it would be desirable to provide automated cropping systems and techniques which can automatically select an appropriate cropping area and/or cropping technique to be used on a particular image.

SUMMARY

Systems and methods according to the present invention provide techniques to automatically crop an image to a desired size. Automating the cropping process, while at the same time providing a high quality, cropped image, can be accomplished by employing a comprehensive approach that includes one or more of contextual cropping (e.g., basing cropping decisions on elements within the image to be cropped itself), training the cropping mechanism (e.g., using previously cropped versions of the same image or related images) and multiple operational modes (e.g., selecting one of a plurality of different cropping techniques for cropping a particular image).

According to an exemplary embodiment of the present invention, a method for image processing includes the steps of determining a first set of image features, growing a potential area to be cropped, determining a second set of features from the potential area to be cropped, comparing the first set of features with the second set of features; and determining a cropping area for an image based on the step of comparing.

According to another exemplary embodiment of the present invention, an image processing system includes a processor for determining a first set of image features, growing a potential area to be cropped, determining a second set of features from the potential area to be cropped, comparing the first set of features with the second set of features, and determining a cropping area for an image based on the step of comparing.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
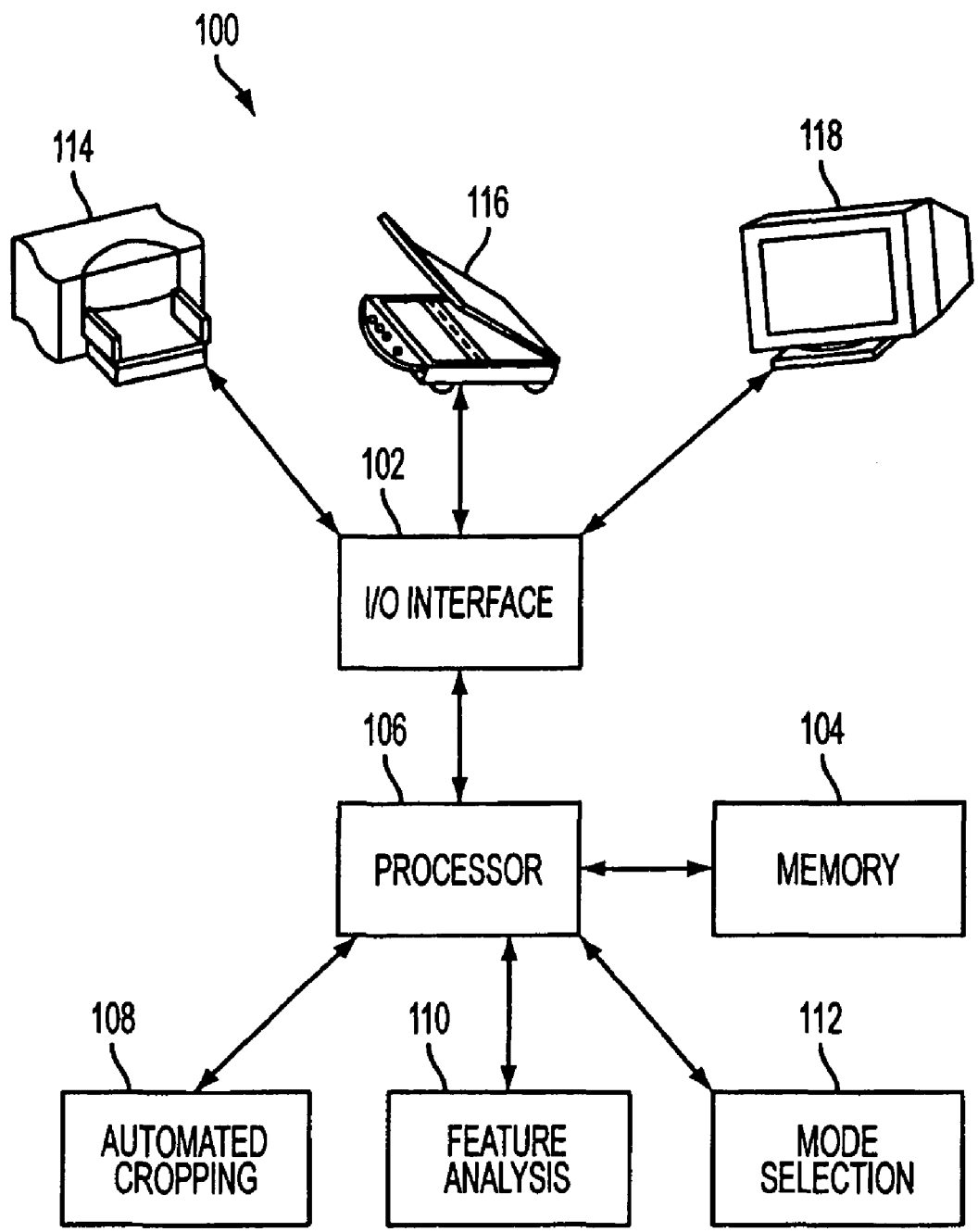
FIG. 1 is an exemplary image processing system.

In order to provide some context for this discussion, an image processing system according to an exemplary embodiment of the present invention will first be described with respect to FIG. 1. Therein, an image processing system 100 includes an I/O interface 102 and a memory device 104 that are connected to a processor 106. These components can be packaged together in, for example, a personal computer. The image processing system 100 further includes an automated cropping function 108, a feature analysis function 110 and a mode selection function 112 which are connected to processor 106. Although the components 102-112 are illustrated in FIG. 1 as separate components of the image processing system 100, two or more of these components may be integrated, thereby decreasing the number of components included in the image enhancing system. Additionally, the components 108-112 may be implemented in any combination of hardware, firmware and software. According to one exemplary embodiment, components 108-112 can be implemented as a software program(s) that perform the functions of the components 108-112, as described below, when executed by the processor 106. Scanner 116 is connected via I/O interface 102 to capture images for processing by image processing system 100. The I/O interface may be a USB port, a serial port or any other interface port that is designed to interface the scanner 116 to the image processing system 100. Alternatively, the I/O interface 102 may be a network interface to receive digital images from a local network (not shown) or from the Internet (not shown). Additionally, other devices, e.g., a digital camera (not shown), may be connected via I/O interface 102 to capture images for processing by image processing system 100. Printer 114 and monitor 118 are connected to the image processing system 100 via I/O interface 102 to provide output devices for, e.g., the processed image data.

According to exemplary embodiments of the present invention, methods and systems are provided which operate to automatically crop an image to a desired size. Automating the cropping process, while at the same time providing a high quality, cropped image, can be accomplished by employing a comprehensive approach that includes one or more of contextual cropping (e.g., basing cropping decisions on elements within the image to be cropped itself), training the cropping mechanism (e.g., using previously cropped versions of the same image or related images) and multiple operational modes (e.g., selecting one of a plurality of different cropping techniques for cropping a particular image). Using the techniques described below, the cropped image will fit into a predetermined layout of a smart template, where the layout modification will allow, for example, a 10-15% modification in each dimension of the image.

Figure 2:
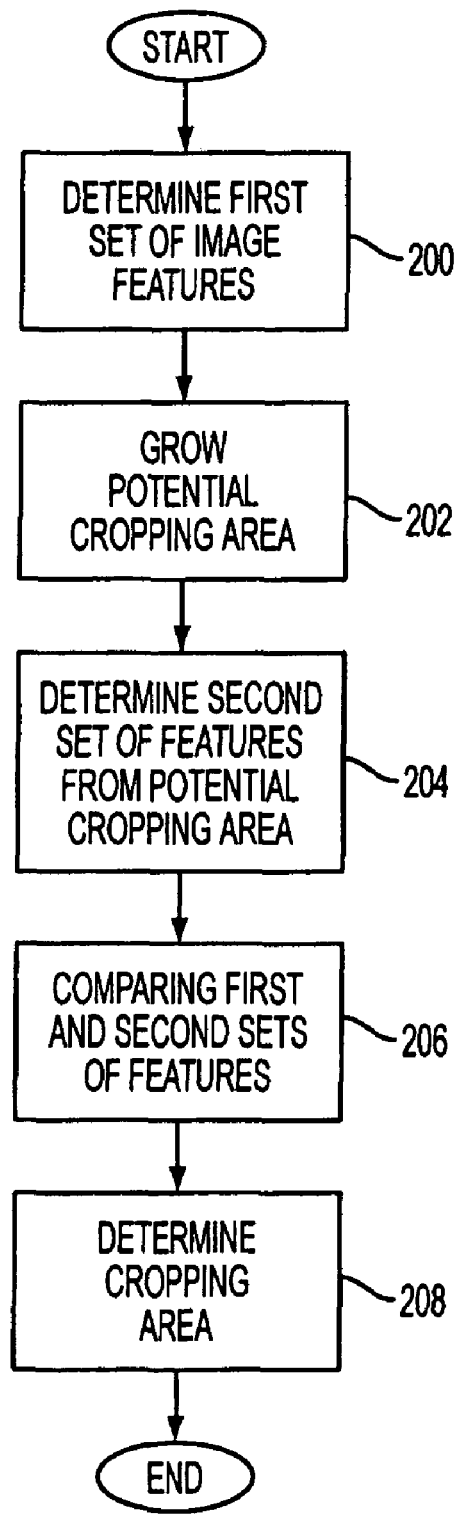
FIG. 2 is flowchart depicting an image processing method according to an exemplary embodiment of the present invention.
Figure 3A:
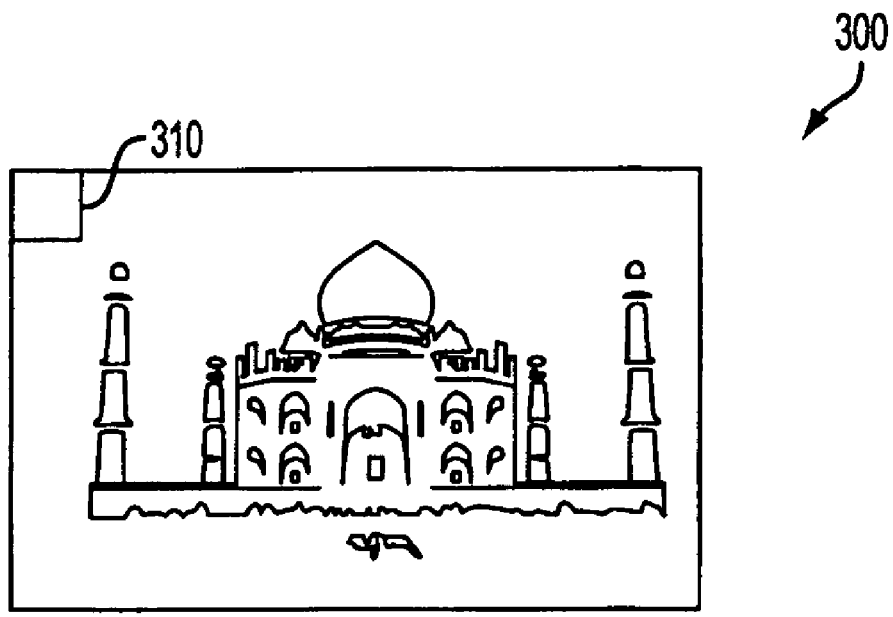
FIGS. 3(a) and 3(b) are images which show a previously cropped area and the growth of a new cropping area according to an exemplary embodiment of the present invention.

A generalized image processing technique according to a first exemplary embodiment of the present invention is depicted in the flow diagram of FIG. 2. This exemplary method identifies a cropping area for an image. A first set of features is determined at step 200. This first set of features provides a reference against which automated cropping can be performed and can include, for example, edge information, color information and/or texture information. As described below with respect to the exemplary embodiments of FIGS. 3 and 4, the first set of features can, for example, be extracted from a previously cropped portion of the same image or from previously cropped portions of other (e.g., related) images. Next, at step 202, the potential area to be cropped is grown. A second set of features, from the potential area to be cropped, is then extracted at step 204 and compared with the first set of features at step 206. The results of the comparison can be used to determine the cropping area at step 208. If, for example, the potential cropping area was grown too far, e.g., such that it includes image features which are undesirable to crop, then this will be indicated by the feature comparison between the first and second sets and used to determine the actual cropping area.

Cropping techniques and methods according to the present invention will be more readily understood upon reading the following, more detailed exemplary embodiments and referring to examples of images being cropped. Consider the image of a building shown in FIG. 3(a), a portion of which (denoted by rectangle 310) was previously cropped out. In this example, an image processing application has requested another cropped version of the image 300, with a further reduced area (i.e., with more of the original image being cropped out), referred to herein as the "target image size". The image area 310 which was previously cropped is analyzed to determine a first set of image features associated therewith. This can be accomplished using, for example, any of a number of different image analysis techniques including color keying, color clustering or saliency mapping. Additional details regarding these techniques are provided below. In this example, color clustering is performed to identify regions of homogenous colors, as conceptually shown in FIG. 3(b). Given the black and white nature of the Figures, it is difficult to completely convey the graphical result of a color clustering analysis on the image of FIG. 3(a), however note that the color clustering operation has the result of removing some detail from the image and grouping together areas of the same (and similar) colors.

Figure 3B:
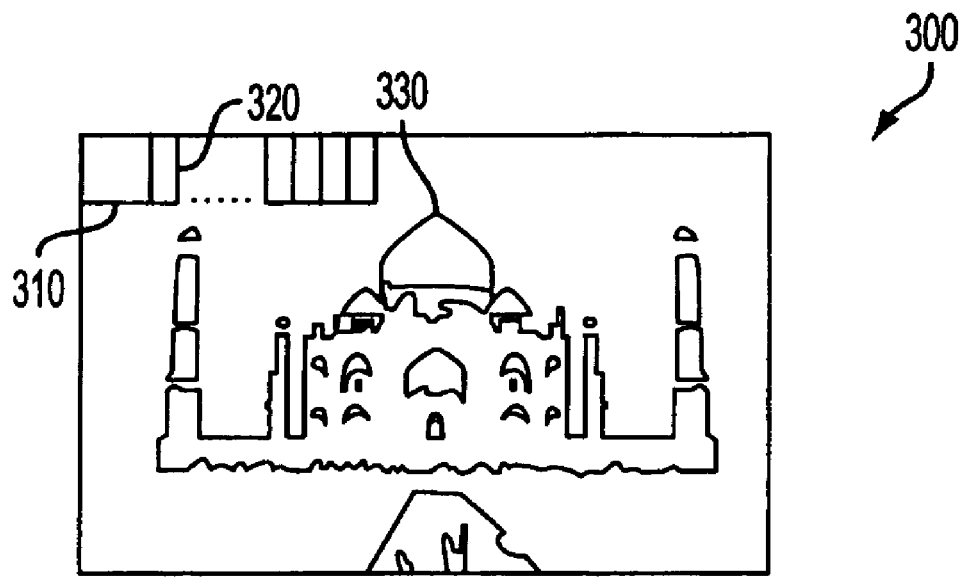
Figure 4:
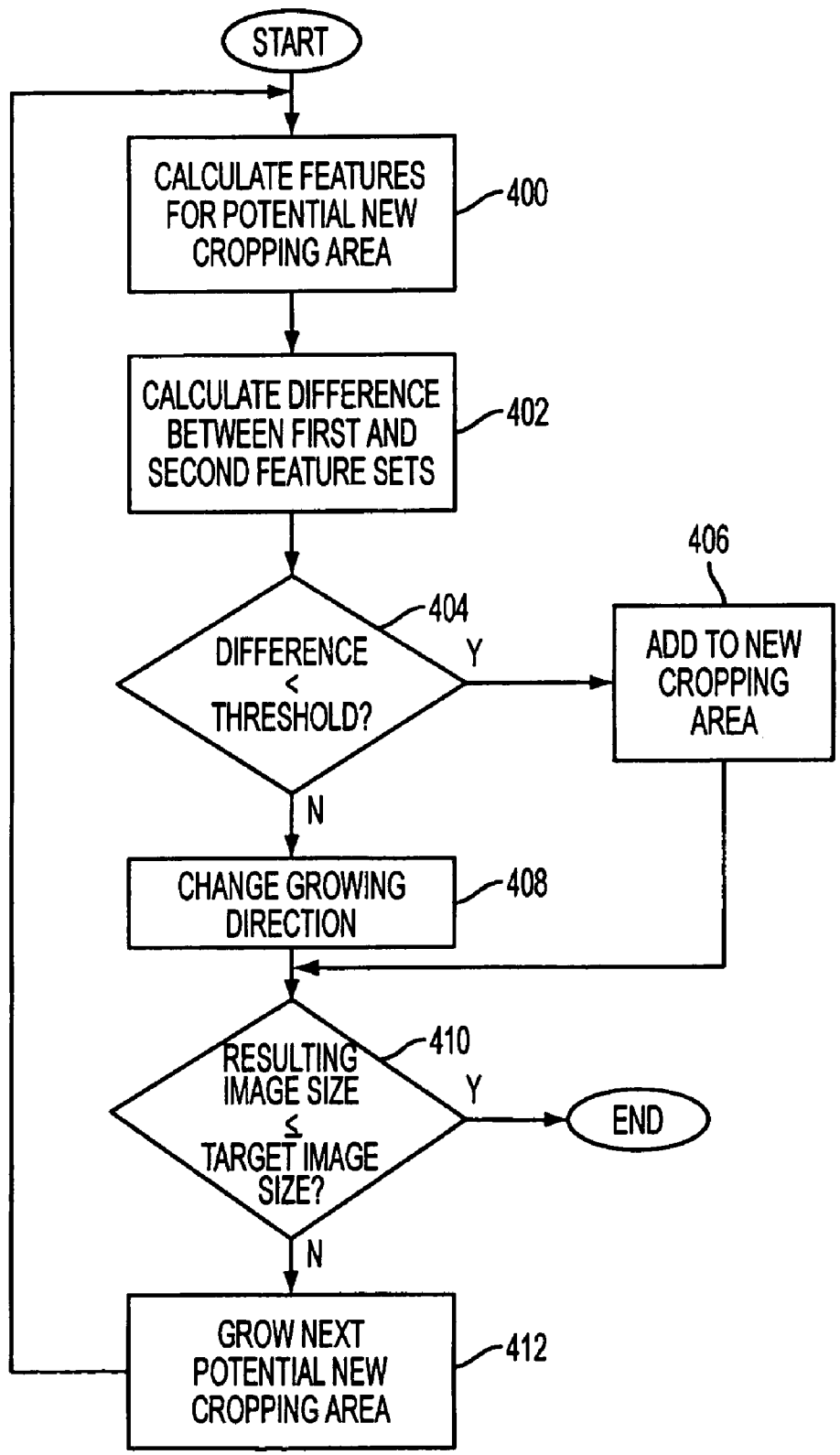
FIG. 4 is a flowchart illustrating an exemplary image processing method according to an exemplary embodiment of the present invention.

The previously cropped area 310 is then grown in the color clustered version of the image by a predetermined growth increment illustrated by the small rectangle 320 in FIG. 3(b). The previously cropped area 310 can, for example, be grown in a direction perpendicular to one or more edges of the previously cropped area 310, as shown in FIG. 3(b). The growth increment can be selected in a number of different ways. For example, the growth increment can be selected to be a single line of pixels if cropping accuracy is considered to be more important than processing speed for a particular application. Alternatively, the growth increment can be calculated as the difference between the target image size and the previously cropped image size divided by a constant.

The newly grown area 320, in conjunction with the previously cropped area 310, represents a potential new cropping area for the image 300, as long as the newly grown area 320 does not crop out desired image features. The potential new cropping area is analyzed as illustrated by the flow diagram of FIG. 4 to make this determination. A second set of features is calculated for the potential new cropping area at step 400. This second set of features is compared with the first set of features to determine a difference therebetween at step 402. If the difference is less than a predetermined threshold (i.e., such that it is determined that desired image features are not within the newly grown area 320), at step 404, then the newly grown area 320 is added to the new cropping area at step 406. Then the size of the image as cropped by the new cropping area is compared with the target image size requested by, e.g., the image processing application which requested the newly cropped version of image 300, at step 410. If the resulting image size is equal to or less than that requested, then the process ends. Otherwise, the next growth increment is determined at step 412 and the process is repeated.

The iterative nature of this process is shown graphically by the additional rectangles in FIG. 3(b) to the right of rectangle 320. To render this example more concrete, consider that the region 350 of image 300 shows a blue sky identified as a color cluster having a value of (58, 83, 123), corresponding to the red, green and blue components, respectively. Similarly, the roof region 330 has a color cluster value of (221, 185, 123). For this example assume that the difference threshold is 100. Thus, the previously cropped area 310 can continue being grown to the right in FIG. 3(b) until hitting the roof region 330 because the Euclidean distance between (58, 83, 123) and (221, 185, 123) is 192, which is larger than the threshold of 100. Euclidean distance calculation is described below. When this occurs, the test in step 404 fails and the flow follows the "N" arrow to block 408 wherein a direction in which the new cropping area was being grown can be switched. For example, growth of the new cropping area could be continued downwardly in FIG. 3(b) when the flow returns to step 412.

The foregoing exemplary embodiment of the present invention provides for automated cropping using a previously cropped version of the same image to provide a reference. According to other exemplary embodiments of the present invention, a cropping reference can be generated using previously cropped versions of related images. This enables automated cropping of images which have not themselves been previously cropped and can be used when, for example, similar types of images are frequently cropped. An example is images of houses used in real estate brochures. There are two aspects to this exemplary embodiment of the present invention. The first aspect is training. During training, a range of images in the same category are cropped manually. The cropped area will be analyzed, as described herein, to establish the features associated with the cropped portions of these types of images, e.g., their texture, edge character and color histogram can be calculated and average values determined. Those average feature values will then be used as the first (reference) set of features for comparison while growing the cropping area for a new image in the manner described above with respect to FIGS. 2 and 4. To provide a better set of reference features, manual cropping can be performed for a number of images from different sides, e.g., top, bottom, left and right. Then a reference set of features can be established for each side on which an image is to be cropped. When a new image is submitted to processor 106 for automatic cropping according to this exemplary embodiment of the present invention, the submitting user or application can also specify the desired image side for cropping and the appropriate reference set of features can be selected for use in the comparison step 404 described above with respect to FIG. 4.

Figure 5:
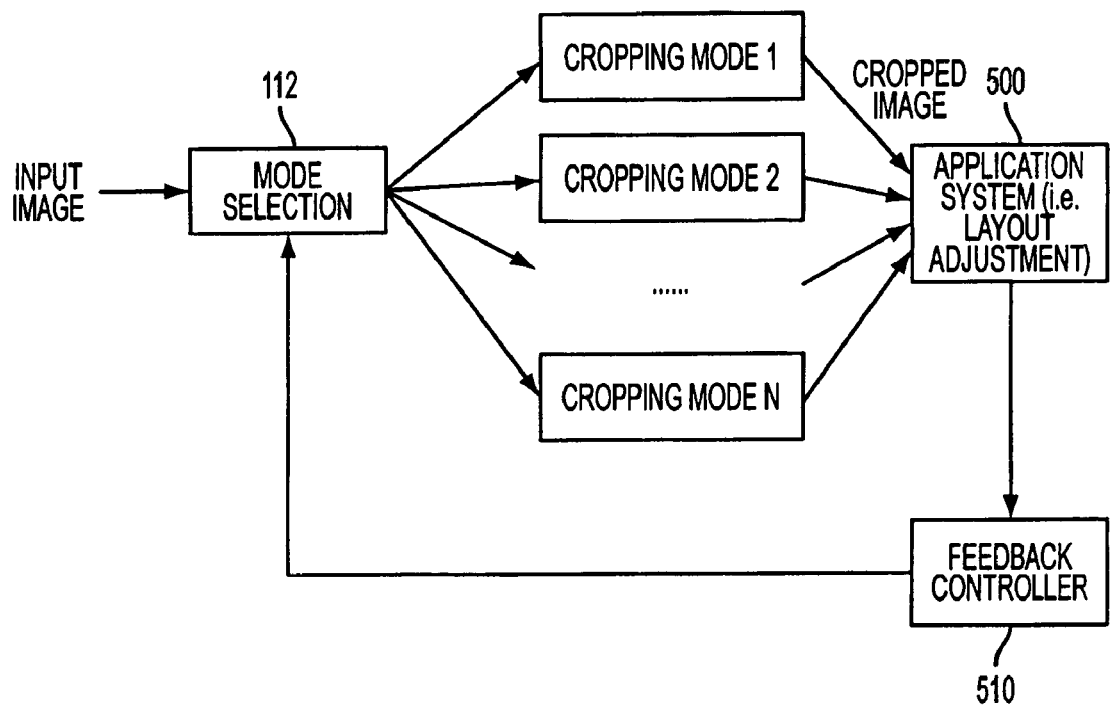
FIG. 5 illustrates a dynamic selection, multiple operation mode exemplary embodiment of the present invention.

As mentioned earlier there are a number of different algorithms which operate to extract features from images or portions of images and which can be used to generate the reference feature sets and feature sets associated with potential cropping areas for comparison. Some examples include the saliency map algorithm, the color keying algorithm and the color clustering algorithm. Readers interested in details of these three algorithms are referred to the article entitled "Automatic Thumbnail Cropping and its Effectiveness", by Bongwon Suh et al., UIST 2003, November 2003, U.S. Pat. No. 5,978,519, entitled "Automatic Image Cropping," by James E. Bollman et al., and the article entitled "A Comparison of Clustering Algorithms Applied to Color Quantization", by P. Scheunders, Pattern Recognition Letters, Vol. 18, pp. 1379-1384, 1997, respectively, the disclosures of which are incorporated here by reference. Exemplary embodiments of the present invention can use the same algorithm across all images and applications. Alternatively, according to other exemplary embodiments of the present invention, the particular technique used to determine the features sets used in the foregoing cropping techniques can be selected dynamically as shown in FIG. 5.

Therein, once an image is input for cropping, mode selection function 112 selects one of a plurality of algorithms (cropping modes) for use in cropping that particular image. The cropped image is then sent to the calling application or system, i.e., the entity which requested a layout adjustment for the input image. According to some exemplary embodiments, a feedback controller 510 provides feedback regarding the quality of the cropped image, which feedback can be used to adjust the way in which mode selection function 112 dynamically selects one of the plurality of cropping modes based on the input image. Those skilled in the art will appreciate that any number of cropping modes can be used in exemplary embodiments of the present invention which dynamically select a cropping mode, however according to one exemplary embodiment three cropping modes are available as depicted in Table 1.

TABLE 1

| Mode No. | Mode Characterization | Cropping Algorithm | Exemplary Image Types Which Can Be Processed Using This Mode |
| --- | --- | --- | --- |
| 1 | Aggressive | Saliency Map | Unedited natural photos with complicated backgrounds. |
| 2 | Conservative | Color Clustering | Objects with relatively even backgrounds. |
| 3 | Ultra-Conservative | Color Keying | Processed product pictures with very homogenous backgrounds. |

Figure 6A:
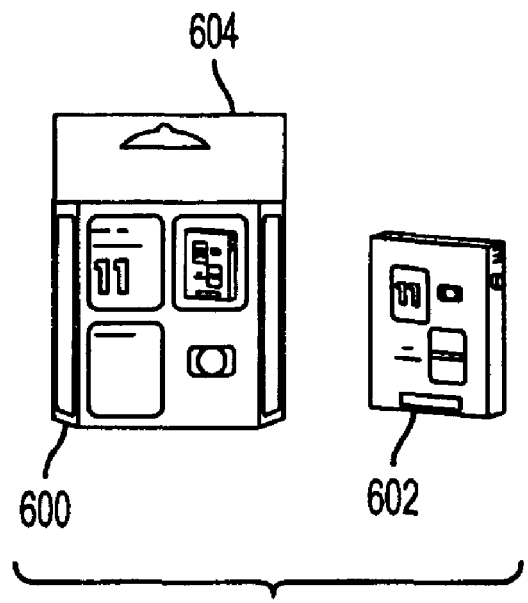
FIGS. 6(a) and 6(b) are images used to show operation of exemplary dynamic selection, multiple operation mode exemplary embodiments of the present invention.
Figure 6B:
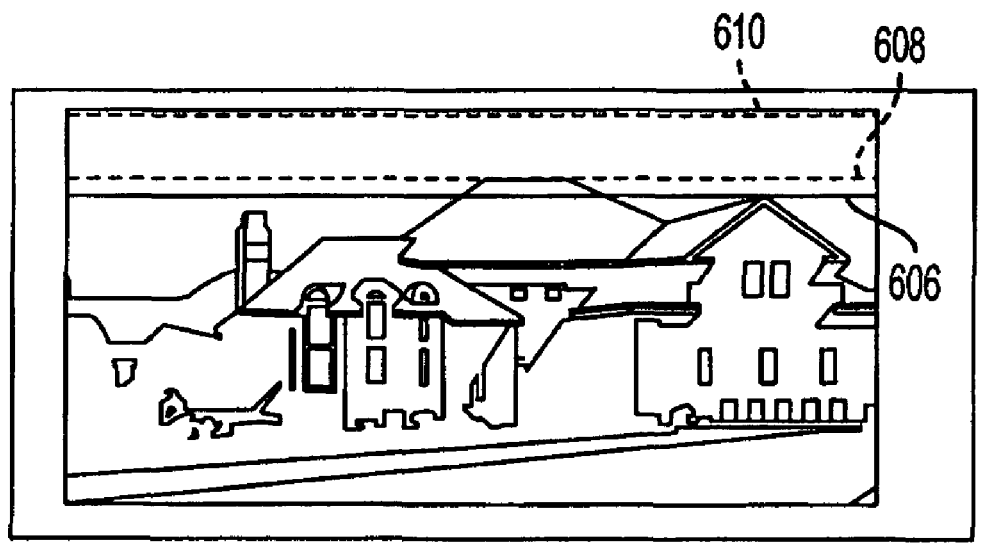

The correlation between exemplary image types and cropping modes can be based upon empirical testing. Consider, for example, the image of FIG. 6(*a*), which is a digital image of two printer cartridge packages, 600 and 602, against a light colored background. Printer cartridge 600 also has a light colored tab 604. Processing the image of FIG. 6(*a*) using each of the three cropping modes resulted in modes #1 and #2 cutting off the tab 604 since the color of the tab 604 was close to that of the image background, such that the features of the tab portion of the image were not distinguished from the features of the background using the two more aggressive algorithms. Conversely, in FIG. 6(*b*), an image of a house is shown having a partially cloudy sky around the house, encased in a white background. The automatic cropping function was set to crop the top of the image, with the resulting cropping lines 606, 608 and 610 resulting from using cropping modes #1, #2 and #3, respectively. For this image, mode #2 was determined to be the most effective, since the color clustering algorithm accurately merged the clouds with the white background and cropped both out.

Various other data and/or techniques can be used in the mode selection function 112 to determine a category associated with an image to aid in mode selection. For example, metadata associated with the images can be used to dynamically select one of a plurality of operating modes. In many applications, an image is retrieved from a central document management system for cropping. The central document system may store metadata associated with the image, including the category of the image. The mode selection function 112 can then choose the cropping mode that is best for the category identified by the metadata. An image category associated with an input image may also be classified automatically using image processing and understanding techniques, such as the method described by Jianying Hu and Amit Bagga in their paper entitled "Categorizing Images in Web Documents", Proceedings of SPIE Conference on Document Recognition and Retrieval X, pp. 136-143, January 2003, the disclosure of which is incorporated here by reference. For certain situations, e.g., receipt of a cropping request from particular applications (such as product catalog publishing application), the category associated with the image may be implicit or directly predefined.

Yet another source for data usable by the mode selection function is feedback from one or more master image processing applications 500 which invoke automated cropping techniques according to the present invention. Consider an application 500 which imposes a constraint on the cropping process. For example, the application 500 may require that the crop comply with a specific aspect ratio. The application 500 can then perform the empirical testing described above with respect to FIGS. 6(*a*) and 6(*b*) by selecting the different operating modes in sequence. For example, application 500 may select the ultra-conservative mode first. If the cropping result generated using this operating mode satisfies other parts of the layout being used by application 500 (e.g., provides sufficient room for a neighboring text section), the application 500 can accept the cropped output using this operating mode. Otherwise, application 500 can resort to more aggressive operating modes using feedback controller 510 to make more room for the other parts of its desired layout.

Other variations on exemplary systems and methods for cropping images can be employed. For example, the mapping from category to cropping mode can be accomplished through training rather than manually. A set of training images are collected, each of which is assigned to a category using methods described earlier and the correct (ground truth) crop is marked manually as a rectangle on the training image. Then the training images are processed using each of the cropping modes. The mode that generates the closest crop (for example, measured as the ratio of overlapping area to the minimal enclosure area) to the ground truth crop is selected for that image. When all of the training images are processed, statistics are generated which can be used to map categories of images to cropping mode. The mode with the largest percentage for each category will be mapped. Consider the exemplary (dummy) statistics shown in Table 2 which were generated from a hypothetical training run as described above.

TABLE 2

| Image Category | Percentage Using Mode 1 | Percentage Using Mode 2 | Percentage Using Mode 3 |
|---|---|---|---|
| 1 | 70% | 20% | 10% |
| 2 | 20% | 20% | 60% |
| 3 | 80% | 10% | 10% |

Given these exemplary statistics, image category 1 can be mapped to ting mode 1, image category 2 can be mapped to mode 3 and image category 3 can also be mapped to mode 1. Another optional aspect of exemplary embodiments of the present invention is to realize the feedback loop shown in FIG. 5 as part of systematic optimization. The different cropping modes represent different levels of risk associated with cropping. For example, the aggressive mode has more risk than the conservative mode since it is more likely to cut off important parts of an image. However, the aggressive mode also has greater potential to improve the overall layout. Thus a systematic approach to optimizing the mode selection process involves optimizing the total score of the equation S(m) =Layout(m)−Risk(m), where m is a particular cropping mode, Layout(m) is the layout quality achieved with the mode m and Risk(m) is the risk of the mode m. The rationale is that, generally, more aggressive cropping methods can lead to a better overall document layout while individual cropped images may be less desirable. Constraint-based algorithms, such as the one introduced in "The Cassowary Linear Arithmetic Constraint Solving Algorithm," *ACM Transactions on Computer Human Interaction*, Vol. 8, No. 4, December 2001, pp. 267-306, by Greg J. Badros et al, the disclosure of which is incorporated here by reference, can be used to implement such an optimization.

The value of Layout(m) can be measured as the Manhattan or the Euclidean distance between the current layout and the target layout (i.e, the original design by the graphic artist). For example:

using the Manhattan distance:

$$\text{Layout}(m) = \sum_{i=1}^{N} |x_i(m) - t_i|$$

using the Euclidean distance:

$$\text{Layout}(m) = \sqrt{\sum_{i=1}^{N} (x_i(m) - t_i)^2}$$

where N is the number of coordinates which determine the layout, $t_i$ is one coordinate defining the target layout and $x_i(m)$ is one coordinate defining the current layout with the cropped images under the cropping mode m. The value of Risk(m) can be either arbitrarily or statistically determined. For example, arbitrary risk values can be assigned as: aggressive cropping risk is 100, conservative cropping risk is 50, and ultra-conservative cropping risk is 20. Risk(m) can also be statistically calculated. For example, a set of images can be tested, each of which is cropped by different modes. The failure rate (defined as the percentage of crops not acceptable to a human operator) can then be manually determined for each cropping mode and used to assign the values of Risk(m).

Systems and methods for image processing according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A computer-implemented method, comprising:
   determining a reference set of values of image features characterizing a cropping reference;
   ascertaining a candidate area of an image as a candidate for inclusion in an area to be cropped;
   generating a candidate set of values of the image features characterizing the candidate area;
   adding the candidate area to the area to be cropped based on a determination that a distance between the reference set of image feature values and the candidate set of image features values satisfies a condition;
   selecting another area of the image as the candidate area;
   repeating the generating, the adding, and the selecting; and
   cropping the area to be cropped from the image to produce a cropped image.

2. The method of claim 1, wherein the determining comprises
   determining the reference set of image feature values from an area of a previously cropped version of the image.

3. The method of claim 1, wherein the determining comprises
   determining the reference set of image feature values based on an area cropped from a second image different from the first image.

4. The method of claim 1, further comprising:
   selecting one of a plurality of different image analysis algorithms to extract said first and second sets of features.

5. The method of claim 4, wherein said plurality of different image analysis algorithms include a color clustering algorithm, a saliency map algorithm and a color keying algorithm.

6. The method of claim 4, wherein said one of a plurality of different image analysis techniques is selected based upon metadata associated with said image.

7. The method of claim 4, wherein said one of said plurality of different image analysis techniques is selected based upon a category associated with said image.

8. The method of claim 4, further comprising:
evaluating a quality associated with said cropped image; and
selecting a different one of said plurality of different image analysis algorithms to use in determining a second cropping area for recropping said image if said quality is less than a predetermined threshold.

9. The method of claim 1, wherein the determining comprises
deriving the reference set of image feature values from areas cropped from a plurality of training images.

10. At least one non-transitory computer-readable medium encoded with computer-readable instructions that, when executed by a computer, cause the computer to perform operations comprising:
determining a reference set of values of image features characterizing a cropping reference;
ascertaining a candidate area of an image as a candidate for inclusion in an area to be cropped;
generating a candidate set of values of the image features characterizing the candidate area;
adding the candidate area to the area to be cropped based on a determination that a distance between the reference set of image feature values and the candidate set of image features values satisfies a condition;
selecting another area of the image as the candidate area;
repeating the generating, the adding, and the selecting; and
cropping the area to be cropped from the image to produce a cropped image.

11. The at least one computer-readable medium of claim 10, wherein in the determining the computer-readable instructions cause the computer to perform operations comprising
determining the reference set of image feature values from an area of a previously cropped version of the image.

12. The at least one computer-readable medium of claim 10, wherein in the determining the computer-readable instructions cause the computer to perform operations comprising
determining the reference set of image feature values based on an area cropped from a second image different from the first image.

13. The at least one computer-readable medium of claim 10, wherein the computer-readable instructions further cause the computer to perform operations comprising
selecting one of a plurality of different image analysis algorithms to extract said first and second sets of features.

14. The at least one computer-readable medium of claim 13, wherein said plurality of different image analysis algorithms include a color clustering algorithm, a saliency map algorithm and a color keying algorithm.

15. The at least one computer-readable medium of claim 13, wherein said one of a plurality of different image analysis techniques is selected based upon metadata associated with said image.

16. The at least one computer-readable medium of claim 13, wherein said one of said plurality of different image analysis techniques is selected based upon a category associated with said image.

17. The at least one computer-readable medium of claim 13, wherein the computer-readable instructions further cause the computer to perform operations comprising:
evaluating a quality associated with said cropped image; and
selecting a different one of said plurality of different image analysis algorithms to use in determining a second cropping area for recropping said image if said quality is less than a predetermined threshold.

18. The at least one computer-readable medium of claim 10, wherein in the determining the computer-readable instructions cause the computer to perform operations comprising
deriving the reference set of image feature values from areas cropped from a plurality of training images.

19. An image processing system comprising:
a computer-readable medium storing computer-readable instructions, and
a processor coupled to the memory, operable to execute the instructions, and based at least in part on the execution of the instructions operable to perform operations comprising:
determining a reference set of values of image features characterizing a cropping reference;
ascertaining a candidate area of an image as a candidate for inclusion in an area to be cropped;
generating a candidate set of values of the image features characterizing the candidate area;
adding the candidate area to the area to be cropped based on a determination that a distance between the reference set of image feature values and the candidate set of image features values satisfies a condition;
selecting another area of the image as the candidate area;
repeating the generating, the adding, and the selecting; and
cropping the area to be cropped from the image to produce a cropped image.

20. The image processing system of claim 19, further comprising:
a software application that requests the image be cropped in accordance with a cropping constraint; and
wherein in the cropping the processor crops the image in accordance with the cropping constraint.

21. The image processing system of claim 19, wherein in the determining the processor performs operations comprising determining the reference set of image feature values from an area of a previously cropped version of the image.

22. The image processing system of claim 19, wherein in the determining the processor performs operations comprising determining the reference set of image feature values based on an area cropped from a second image different from the image.

23. The image processing system of claim 19, wherein based at least in part on the execution of the instructions the processor is operable to perform operations comprising selecting one of a plurality of different image analysis algorithms to extract said first and second sets of features.

24. The image processing system of claim 23, wherein said plurality of different image analysis algorithms include a color clustering algorithm, a saliency map algorithm and a color keying algorithm.

25. The image processing system of claim 23, wherein said one of a plurality of different image analysis techniques is selected based upon metadata associated with said image.

26. The image processing system of claim 23, wherein said one of said plurality of different image analysis techniques is selected based upon a category associated with said image.

27. The image processing system of claim 23, wherein said processor, evaluates a quality associated with said cropped image; and selects a different one of said plurality of different image analysis algorithms to use in determining a second cropping area for recropping said image if said quality is less than a predetermined threshold.

28. The image processing system claim 19, wherein based at least in part on the execution of the instructions the processor performs operations comprising deriving the reference set of image feature values from areas cropped from a plurality of training images.

29. An image processing system, comprising:
    means for determining a reference set of values of image features characterizing a cropping reference;
    means for ascertaining a candidate area of an image as a candidate for inclusion in an area to be cropped;
    means for generating a candidate set of values of the image features characterizing the candidate area;
    means for adding the candidate area to the area to be cropped based on a determination that a distance between the reference set of image feature values and the candidate set of image features values satisfies a condition;
    means for selecting another area of the image as the candidate area;
    repeating the generating, the adding, and the selecting; and
    means for cropping the area to be cropped from the image to produce a cropped image.

30. A method for image processing, comprising the steps of:
    selecting a first cropping area of an image;
    determining a first set of image features for said first cropping area;
    growing said first cropping area along a first direction of said image to a potential area to be cropped, said potential area including said first cropping area and a second cropping area;
    determining a second set of features from said second cropping area;
    comparing said first set of features with said second set of features;
    determining a cropping area for said image based on said step of comparing; and
    further comprising the step of selecting one of a plurality of different image analysis algorithms to extract said first and second sets of features, wherein said step of selecting one of said plurality of different image analysis algorithms to extract said first and second sets of features further comprises the steps of:
        calculating a score based on an image cropping risk factor and a layout quality factor; and
        selecting said one of said plurality of different image analysis algorithms based on said score.

31. The computer-readable medium of claim 13, wherein said step of selecting one of said plurality of different image analysis algorithms to extract said first and second sets of features further comprises the steps of:
    calculating a score based on an image cropping risk factor and a layout quality factor; and
    selecting said one of said plurality of different image analysis algorithms based on said score.

32. The image processing system of claim 23, wherein said processor selects said one of said plurality of different image processing algorithms by calculating a score based on an image cropping risk factor and a layout quality factor and selecting said one of said plurality of different image analysis algorithms based on said score.

33. The method of claim 1, wherein each of multiple iterations of the repeating comprises selecting another area of the image adjacent the candidate area in a first growth direction in response to a determination that the distance satisfies the condition, and selecting another area adjacent the candidate area in a second growth direction different from the first growth direction in response to a determination that the distance fails to satisfy the condition.

34. The method of claim 1, wherein each candidate area corresponds to a predetermined increment of growth of the area to be cropped.

35. The at least one computer-readable medium of claim 10, wherein in each of multiple iterations of the repeating the instructions cause the computer to perform operations comprising selecting another area of the image adjacent the candidate area in a first growth direction in response to a determination that the distance satisfies the condition, and selecting another area adjacent the candidate area in a second growth direction different from the first growth direction in response to a determination that the distance fails to satisfy the condition.

36. The medium of claim 10, wherein each candidate area corresponds to a predetermined increment of growth of the area to be cropped.

37. The system of claim 19, wherein in each of multiple iterations of the repeating the processor is operable to perform operations comprising selecting another area of the image adjacent the candidate area in a first growth direction in response to a determination that the distance satisfies the condition, and selecting another area adjacent the candidate area in a second growth direction different from the first growth direction in response to a determination that the distance fails to satisfy the condition.

38. The system of claim 19, wherein each candidate area corresponds to a predetermined increment of growth of the area to be cropped.

39. The method of claim 1, further comprising selecting a respective cropping mode from a set of cropping modes each of which corresponds to a different respective level of cropping aggressiveness and is associated with a different method of performing the generating of the candidate sets of image feature values.

40. The at least one computer-readable medium of claim 10, wherein the instructions further cause the computer to perform operations comprising selecting a respective cropping mode from a set of cropping modes each of which corresponds to a different respective level of cropping aggressiveness and is associated with a different method of performing the generating of the candidate sets of image feature values.

41. The system of claim 19, based at least in part on the execution of the instructions the processor is operable to perform operations comprising selecting a respective cropping mode from a set of cropping modes each of which corresponds to a different respective level of cropping aggressiveness and is associated with a different method of performing the generating of the candidate sets of image feature values.

* * * * *

UNITED STATES PATENT AND TRADEMARK OFFICE
CERTIFICATE OF CORRECTION

| | | |
|---|---|---|
| PATENT NO. | : 8,391,593 B2 | Page 1 of 1 |
| APPLICATION NO. | : 10/863963 | |
| DATED | : March 5, 2013 | |
| INVENTOR(S) | : Xiaofan Lin et al. | |

It is certified that error appears in the above-identified patent and that said Letters Patent is hereby corrected as shown below:

In the Claims

In column 11, line 1, in Claim 28, delete "system" and insert -- system of --, therefor.

In column 11, line 48, in Claim 31, delete "The" and insert -- The at least one --, therefor.

Signed and Sealed this
Ninth Day of July, 2013

Teresa Stanek Rea
*Acting Director of the United States Patent and Trademark Office*